(12) United States Patent
Sutardja et al.

(10) Patent No.: US 9,396,146 B1
(45) Date of Patent: Jul. 19, 2016

(54) TIMING-BUDGET-BASED QUALITY-OF-SERVICE CONTROL FOR A SYSTEM-ON-CHIP

(71) Applicant: Marvell International Ltd., Hamilton (BM)

(72) Inventors: Pantas Sutardja, Los Gatos, CA (US); Jun Zhu, San Jose, CA (US); Joseph Jun Cao, Los Gatos, CA (US)

(73) Assignee: Marvell International LTD., Hamilton (BM)

( * ) Notice: Subject to any disclaimer, the term of this patent is extended or adjusted under 35 U.S.C. 154(b) by 537 days.

(21) Appl. No.: 13/899,925

(22) Filed: May 22, 2013

Related U.S. Application Data (60) Provisional application No. 61/661,182, filed on Jun. 18, 2012.

(51) Int. Cl.
*G06F 13/36* (2006.01)
*G06F 13/362* (2006.01)

(52) U.S. Cl.
CPC .. *G06F 13/3625* (2013.01); *G05B 2219/15099* (2013.01)

(58) Field of Classification Search
CPC ............ G05B 2219/15099; G06F 13/14; G06F 13/18; G06F 13/362; G06F 13/364; G06F 13/1605; G06F 13/1663
USPC .................................. 710/240–244
See application file for complete search history.

(56) References Cited

U.S. PATENT DOCUMENTS

| | | | | |
|---|---|---|---|---|
| 6,343,351 B1* | 1/2002 | Lackman | ............... | G06F 3/0611 710/54 |
| 6,378,052 B1* | 4/2002 | Genduso | ................. | G06F 3/061 710/39 |
| 7,089,381 B2* | 8/2006 | Horn | ..................... | G06F 9/4881 710/240 |
| 7,093,256 B2* | 8/2006 | Bloks | ..................... | G06F 9/4887 370/395.4 |
| 7,284,080 B2* | 10/2007 | Lin | ..................... | G06F 13/1605 710/116 |
| 7,417,637 B1* | 8/2008 | Donham | ................ | G09G 5/001 345/506 |
| 7,769,936 B2* | 8/2010 | Mace | ..................... | G06F 13/364 710/113 |
| 7,802,040 B2* | 9/2010 | Aldworth | ............ | G06F 13/1626 710/110 |
| 7,908,416 B2* | 3/2011 | Kato | ..................... | G06F 13/364 700/3 |
| 8,037,261 B2* | 10/2011 | Herndon | .......... | H04N 21/42692 710/244 |
| 8,151,008 B2* | 4/2012 | Simon | ..................... | G06F 13/28 710/22 |
| 8,190,804 B1* | 5/2012 | Srinivasan | .......... | G06F 13/1615 710/240 |
| 8,402,249 B1* | 3/2013 | Zhu | ..................... | G06F 12/0292 711/173 |
| 8,407,440 B2* | 3/2013 | Le Moal | ............... | G06F 3/0625 711/100 |
| 8,812,797 B2* | 8/2014 | Henriksson | ......... | G06F 13/1668 370/294 |
| 9,026,748 B2* | 5/2015 | Staelin | .................. | G06F 9/5083 711/112 |

* cited by examiner

Primary Examiner — Brian Misiura (57) ABSTRACT

A system-on-chip including an ingress arbiter module to receive a plurality of service requests from a plurality of devices located upstream to access a resource located downstream. Each of the service requests includes a quality of service value and a first timing budget value specified by the respective device to indicate an amount of time in which the respective service request is to be serviced by the resource. The ingress arbiter module selects a first service request based on the quality of service values, the first timing budget values, and a time delay associated with arbitrating the plurality of service requests and outputting the first service request downstream. A timing budget generator module generates a second timing budget value for the first service request based on the first timing budget value associated with the first service request, and the time delay.

20 Claims, 6 Drawing Sheets

FIG. 1

FIG. 2B
Single-CH Serialization Module

FIG. 2A
Multi-CH Serialization Module

TIMING-BUDGET-BASED QUALITY-OF-SERVICE CONTROL FOR A SYSTEM-ON-CHIP

CROSS-REFERENCE TO RELATED APPLICATIONS

This claims the benefit of U.S. Provisional Application No. 61/661,182, filed on Jun. 18, 2012. The entire disclosure of the application referenced above is incorporated herein by reference.

FIELD

The present disclosure relates generally to integrated circuits and more particularly to timing-budget-based quality-of-service (QOS) control for a system-on-chip (SOC).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A system-on-chip (SOC) includes one or more processors and device controllers that use shared resources of the SOC. For example, the device controllers may control devices such as a display, one or more peripherals, and so on associated with the SOC. For example, the shared resources of the SOC may include memory. The processors and the device controllers may share the resources to control the respective devices.

SUMMARY

A system-on-chip comprises an ingress arbiter module and a timing budget generator module. The ingress arbiter module is configured to receive a plurality of service requests respectively from a plurality of devices of the system-on-chip to access a resource of the system-on-chip. The plurality of devices is located upstream in the system-on-chip relative to the ingress arbiter module. The resource is located downstream in the system-on-chip relative to the ingress arbiter module. Each of the service requests includes (i) a quality of service value associated with the respective service request, and (ii) a first timing budget value specified by the respective device for the respective service request. The timing budget value indicates an amount of time in which the respective service request is to be serviced by the resource. The ingress arbiter module is configured to select a first service request from the plurality of service requests based on (i) the quality of service values, (ii) the first timing budget values, and (iii) a time delay associated with arbitrating the plurality of service requests and outputting the first service request downstream. The timing budget generator module is configured to generate a second timing budget value for the first service request based on (i) the first timing budget value associated with the first service request, and (ii) the time delay.

In other features, the system further comprises a queuing module configured to place the first service request in a queue, and output the first service request downstream from the queue in a first-in first-out manner with (i) the quality of service value associated with the first service request and (ii) the second timing budget value associated with the first service request.

In other features, the first and second timing budget values are based on a global clock of the system-on-chip, and the ingress arbiter module and the timing budget generator module use a local clock, and the system further comprises a synchronization and timestamp module configured to synchronize the plurality of service requests to the local clock, and timestamp, based on the local clock, each of the plurality of service requests with a first time stamp in response to receiving each of the plurality of service requests.

In other features, the timing budget generator module is configured to timestamp, based on the local clock, the first service request with a second time stamp when outputting the first service request downstream, and the time delay associated with arbitrating the plurality of service requests and outputting the first service request downstream is based on a difference between (i) the first time stamp associated with the first service request, and (ii) the second time stamp associated with the first service request.

In other features, the first service request is received from a first device of the plurality of devices, and the arbiter module is configured to select, from the plurality of service requests, a second service request received from a second device of the plurality of devices, based on (i) the quality of service values, (ii) the first timing budget values, and (iii) a time delay associated with arbitrating the plurality of service requests and outputting the second service request downstream.

In other features, the timing budget generator module is configured to generate a third timing budget value for the second service request based on (i) the first timing budget value associated with the second service request, and (ii) the time delay associated with arbitrating the plurality of service requests and outputting the second service request downstream.

In other features, the system further comprises a queuing module configured to place the first service request in a first queue associated with the first device, place the second service request in a second queue associated with the second device, output the first service request from the first queue in a first-in first-out manner with (i) the quality of service value associated with the first service request and (ii) the second timing budget value associated with the first service request, and output the second service request from the second queue in a first-in first-out manner with (i) the quality of service value associated with the second service request and (ii) the third timing budget value associated with the second service request.

In other features, the system further comprises an egress arbiter module configured to arbitrate the first service request output from the first queue and the second service request output from the second queue based on (i) the quality of service values associated with the first and second service requests, and (ii) the second and third timing budget values associated with the first and second service requests.

In other features, the first, second, and third timing budget values are based on a global clock of the system-on-chip, and wherein the ingress arbiter module and the timing budget generator module use a local clock, and the system further comprises a synchronization and timestamp module configured to synchronize the plurality of service requests to the local clock, and timestamp, based on the local clock, each of the plurality of service requests with a first time stamp in response to receiving each of the plurality of service requests.

In other features, the timing budget generator module is configured to timestamp, based on the local clock, (i) the first service request with a second time stamp when outputting the first service request downstream, and (ii) the second service request with a third time stamp when outputting the second service request downstream, and the time delay associated with arbitrating the plurality of service requests and outputting the second service request downstream is based on a difference between (i) the first time stamp associated with the second service request, and (ii) the third time stamp associated with the first service request.

In still other features, a method comprises receiving a plurality of service requests respectively from a plurality of devices of a system-on-chip to access a resource of the system-on-chip. The plurality of devices is located upstream in the system-on-chip. The resource is located downstream in the system-on-chip. Each of the service requests includes (i) a quality of service value associated with the respective service request, and (ii) a first timing budget value specified by the respective device for the respective service request. The timing budget value indicates an amount of time in which the respective service request is to be serviced by the resource. The method further comprises selecting a first service request from the plurality of service requests based on (i) the quality of service values, (ii) the first timing budget values, and (iii) a time delay associated with arbitrating the plurality of service requests and outputting the first service request downstream. The method further comprises generating a second timing budget value for the first service request based on (i) the first timing budget value associated with the first service request, and (ii) the time delay.

In other features, the method further comprises placing the first service request in a queue, and outputting the first service request downstream from the queue in a first-in first-out manner with (i) the quality of service value associated with the first service request and (ii) the second timing budget value associated with the first service request.

In other features, the first and second timing budget values are based on a global clock of the system-on-chip, and wherein the (i) receiving, (ii) selecting, (iii) outputting, and (iv) generating are performed using a local clock, and the method further comprises synchronizing the plurality of service requests to the local clock, and timestamping, based on the local clock, each of the plurality of service requests with a first time stamp in response to receiving each of the plurality of service requests.

In other features, the method further comprises timestamping, based on the local clock, the first service request with a second time stamp when outputting the first service request downstream. The time delay associated with arbitrating the plurality of service requests and outputting the first service request downstream is based on a difference between (i) the first time stamp associated with the first service request, and (ii) the second time stamp associated with the first service request.

In other features, the method further comprises receiving the first service request from a first device of the plurality of devices, and selecting, from the plurality of service requests, a second service request received from a second device of the plurality of devices, based on (i) the quality of service values, (ii) the first timing budget values, and (iii) a time delay associated with arbitrating the plurality of service requests and outputting the second service request downstream.

In other features, the method further comprises generating a third timing budget value for the second service request based on (i) the first timing budget value associated with the second service request, and (ii) the time delay associated with arbitrating the plurality of service requests and outputting the second service request downstream.

In other features, the method further comprises placing the first service request in a first queue associated with the first device, placing the second service request in a second queue associated with the second device, outputting the first service request from the first queue in a first-in first-out manner with (i) the quality of service value associated with the first service request and (ii) the second timing budget value associated with the first service request, and outputting the second service request from the second queue in a first-in first-out manner with (i) the quality of service value associated with the second service request and (ii) the third timing budget value associated with the second service request.

In other features, the method further comprises arbitrating the first service request output from the first queue and the second service request output from the second queue based on (i) the quality of service values associated with the first and second service requests, and (ii) the second and third timing budget values associated with the first and second service requests.

In other features, the first, second, and third timing budget values are based on a global clock of the system-on-chip, and wherein the (i) receiving, (ii) selecting, (iii) outputting, and (iv) generating are performed using a local clock, and the method further comprises synchronizing the plurality of service requests to the local clock, and timestamping, based on the local clock, each of the plurality of service requests with a first time stamp in response to receiving each of the plurality of service requests.

In other features, the method further comprises timestamping, based on the local clock, (i) the first service request with a second time stamp when outputting the first service request downstream, and (ii) the second service request with a third time stamp when outputting the second service request downstream. The time delay associated with arbitrating the plurality of service requests and outputting the second service request downstream is based on a difference between (i) the first time stamp associated with the second service request, and (ii) the third time stamp associated with the first service request.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1:
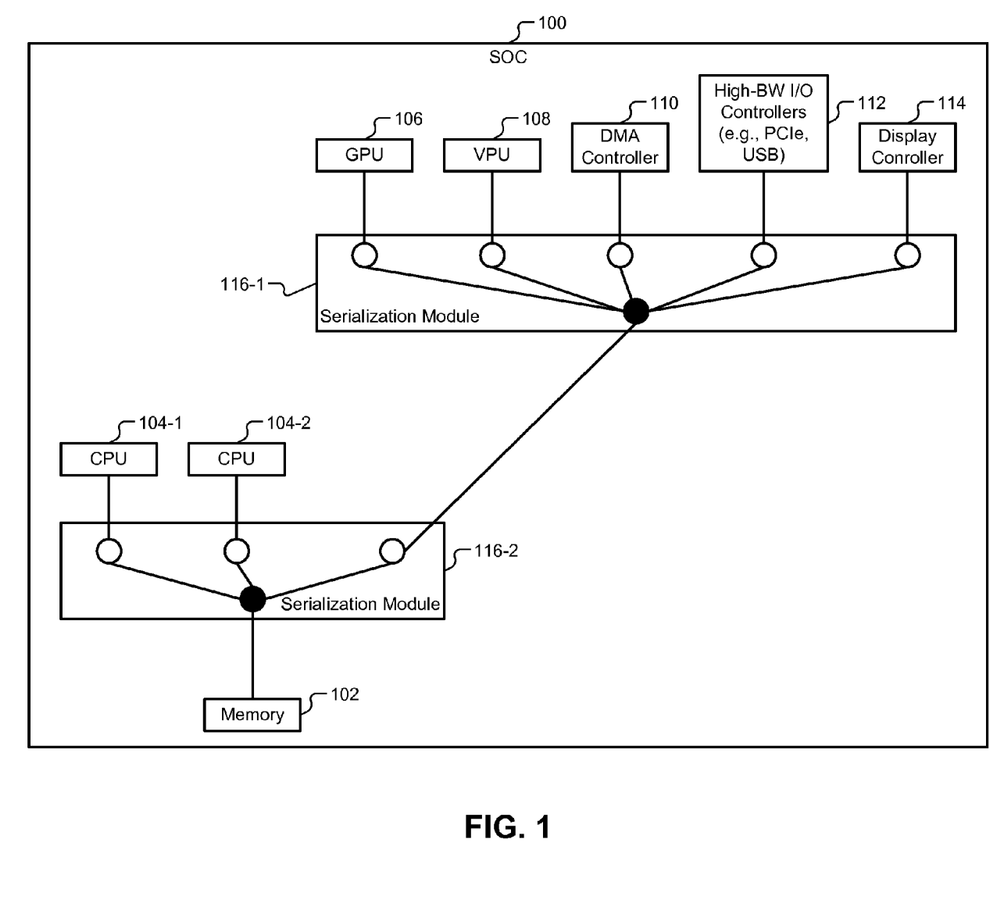
FIG. 1 is a functional block diagram of a system-on-chip (SOC) according to the present disclosure.

FIG. 1 shows an example of a system-on-chip (SOC) 100. The SOC 100 includes a memory 102; one or more central processing units CPU 104-1, CPU 104-2, and so on (collectively CPUs 104); a graphics processing unit (GPU) 106; a video processing unit (VPU) 108; a direct memory access (DMA) controller 110; one or more high-bandwidth input-output controllers (e.g., a PCIe controller, a USB controller, and so on) 112; and a display controller 114. For example only, the memory 102 may include a double-data-rate (DDR) memory. For example only, the display controller 114 may include a liquid crystal display (LCD) controller.

The SOC 100 additionally includes one or more serialization modules 116-1, 116-2, and so on (collectively serialization modules 116). The serialization modules 116 are points of serialization that serialize commands received from a plurality of devices located upstream. For example, the serialization module 116-1 may receive commands from one or more of the GPU 106, the VPU 108, the DMA controller 110, one or more of the input-output controllers 112, and the display controller 114. The commands may request access to one or more of the CPUs 104, the memory 102, or both. The serialization module 116-1 may serialize the commands and may output the serialized commands on one or more system buses via which the serialization module 116-1 communicates with the CPUs 104, the serialization module 116-2, and the memory 102. The serialization module 116-2 may receive commands from one or more of the CPUs 104. The serialization module 116-2 may serialize the commands and may output the serialized commands on the one or more system buses.

The CPUs 104, the GPU 106, the VPU 108, the DMA controller 110, the input-output controllers 112, and the display controller 114 seek to request control one or more system buses and are called bus masters. The serialization modules 116-1 and 116-2 grant one of the bus masters access to the shared resources via one or more system buses at a given time. Different bus masters have different levels of urgency to access the shared resources.

A multi-level serialization module structure (e.g., the structure shown including the two serialization modules 116-1 and 116-2) may create blocking situations. For example, the high-bandwidth input-output controllers 112 may generate a relatively large amount of traffic that can flood the system buses. Flooding the system buses may block access to the system buses by other devices. For example, the display controller 114 may be unable to access the system buses at a frequency necessary to properly display data. Low-latency devices such as the CPUs 104 may be blocked by other system traffic, which can degrade the performance of the low-latency devices.

Quality-of-Service (QOS) can be used to minimize the blocking situations. Bus masters can send requests including respective QOS requirements to downstream devices. The QOS requirements can inform the downstream devices how important or urgent the requests are. The downstream devices can take the information into account when performing bus arbitration and command queuing. One or more virtual channels and dynamic QOS can be used to improve performance.

Figure 2A:
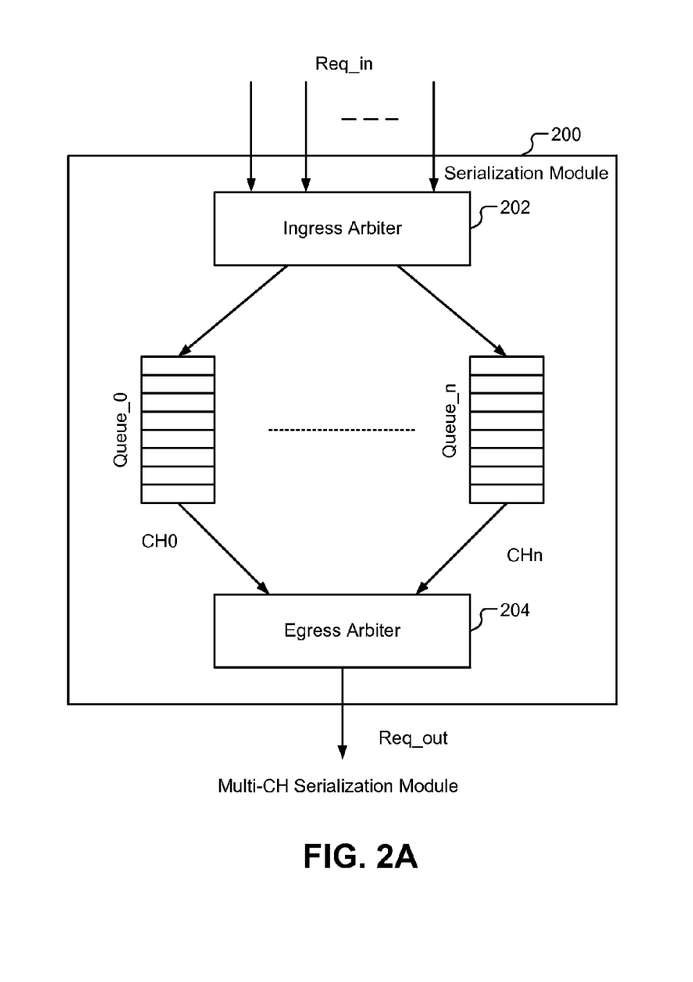
FIG. 2A is a functional block diagram of a serialization module including multiple channels according to the present disclosure.
Figure 2B:
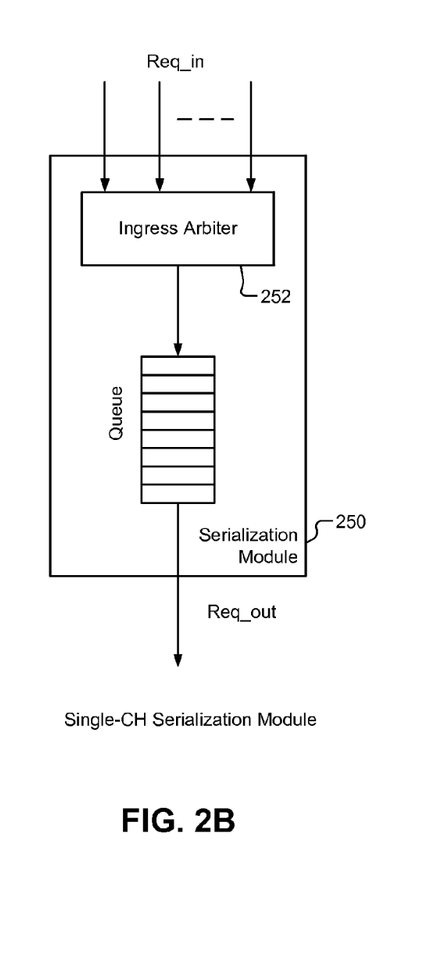
FIG. 2B is a functional block diagram of a serialization module including a single channel according to the present disclosure.

FIGS. 2A and 2B show two example configurations of serialization modules. FIG. 2A shows a serialization module 200 including multiple channels or virtual channels CH0, . . . , and CHn, where n is an integer greater than 1; an ingress arbiter 202; and an egress arbiter 204. FIG. 2B shows a serialization module 250 including a single channel and an ingress arbiter 252.

The ingress arbiters 202, 252 perform arbitration of input requests, which are received with respective QOS data. For multi-channel or virtual-channel configuration (e.g., serialization module 200), the ingress arbiter 202 dispatches a winning request to a corresponding queue. An input request at the top of the queue is sent out as an output request. The QOS of the output request is either the original QOS from the input request or a re-generated QOS generated using an algorithm. In a multi-channel or virtual-channel serialization module (e.g., serialization module 200), the egress arbiter 204 performs arbitration of output requests that are output from the multiple channels.

Figure 3:
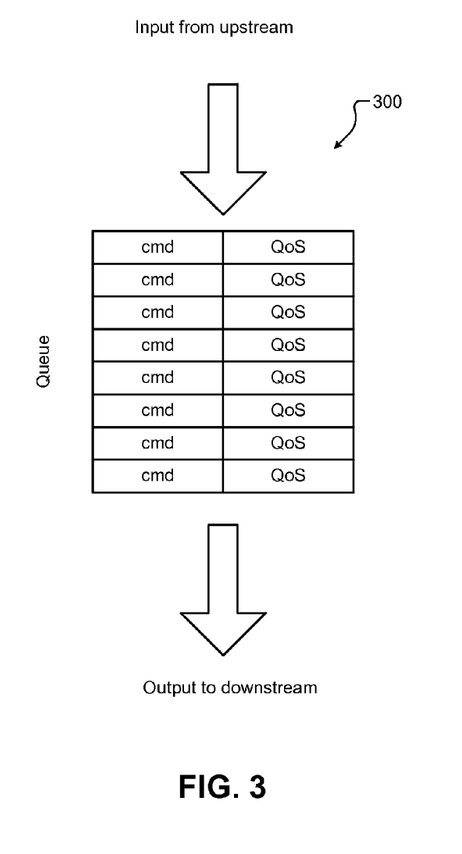
FIG. 3 shows an example of a queue in a serialization module according to the present disclosure.

FIG. 3 shows an example of a queue 300 of a serialization module. The queue 300 includes command information and QOS information. The command information includes access command information such as command id, access type, address, and controls (e.g., security). The QOS information includes a number showing the importance or urgency of a command. For example, in an ARM AMBA system, the QOS information may include a 4-bit number. Generally, the importance or urgency of a command is proportional to the value of the QOS information.

In some implementations, a read queue may be separate from a write queue. The queues are usually managed in a first-in first-out (FIFO) manner. To improve performance, the commands in a queue can be re-ordered. Re-ordering commands, however, requires complicated ordering controls and rules, which can increase cost of implementation.

Figure 4:
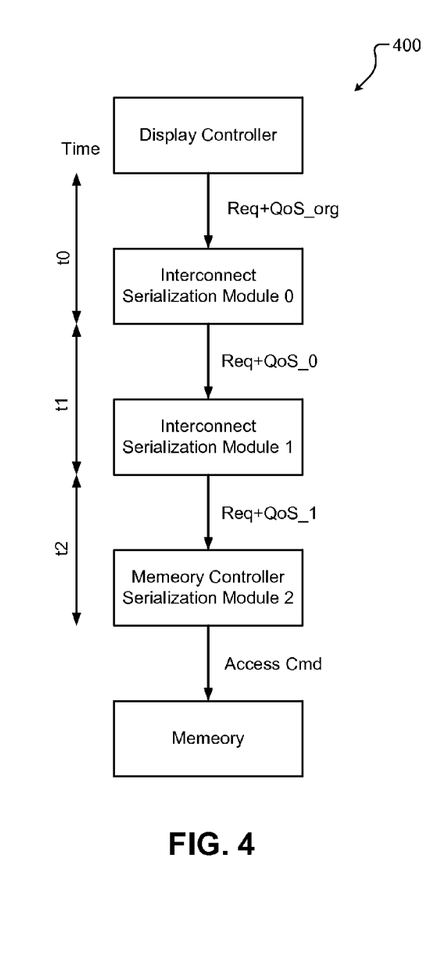
FIG. 4 shows an example of a flow of a command from a display controller to memory in an SOC without using timing budget to control quality-of-service (QOS) in the SOC.

FIG. 4 shows an example of a flow 400 of a command from the display controller 114 to the memory 102. Suppose that the display controller 114 accesses the memory 102 via three-level serialization modules: two levels of interconnect serialization modules and one level serialization module in a memory controller of the memory 102. That is, suppose that there are three serialization modules between the display controller 114 and the memory 102: an interconnect serialization module 0, an interconnect serialization module 1, and a serialization module 2 associated with the memory controller of the memory 102.

Generally, the bus master (e.g., the device such as the display controller 114 issuing a request to gain control of a bus) has the best information regarding how urgent the request is. QOS_org indicates the information at the moment when the bus master sends out the request. After a delay t0, the request passes through serialization module 0 and is sent out to serialization module 1. The serialization module 0 may change the QOS value QOS_org to QOS_0. After a delay t1, the request passes through serialization module 1 and is sent out to serialization module 2. The serialization module 1 may change the QOS value QOS_0 to QOS_1. After a delay t2, the request passes through serialization module 2 and is sent out to the final destination, the memory 102. The total time (t0+t1+t2) determines the final QOS of the access. To meet real-time requirement, a condition (t0+t1+t2)<max_latency should be met, where max_latency is a maximum latency tolerable by the display controller 114.

All devices in the path from serialization module 0 to serialization module 2 may run at different clock speeds, and each serialization module may have a different arbitration scenario/situation at different times. Each serialization module may have its own local view of a request instead of a global view. For example, serialization module 1 may not know how long serialization module 0 takes to process the request (t0) and may have no information regarding how long t1 should be.

One way to solve this problem is using the highest QOS value for real-time bus masters to push the requests through all serialization modules as soon as possible. This solution, however, can be problematic for various reasons. For example, the solution can be potentially over-constrained. Further, efficiently handling a combination of multiple real-time bus masters (e.g., the display controller 114) and multiple low-latency bus masters (e.g., the CPUs 104) can be difficult. In addition, the real-time bus masters do not need to have the highest priority as long as their max_latency requirement is met.

The present disclosure relates to a timing-budget-based QOS scheme. A timing budget is specified by the bus master and is included with a request issued by the bus master. A timing budget is an amount of time in which a request should be serviced by a resource to maintain a predetermined performance level. In a path between the bus master and a resource that will service the request, a timing budget received by a serialization module downstream from a bus master (or a serialization module) located upstream is an amount of time in which the request issued by the bus master upstream should be serviced by the resource to maintain a predetermined performance level of the bus master. Accordingly, each serialization module in the path knows how much time the serialization module has to arbitrate and output the request to improve SOC performance. The timing budget is passed down from one serialization module to another as described below to improve SOC performance.

Figure 5:
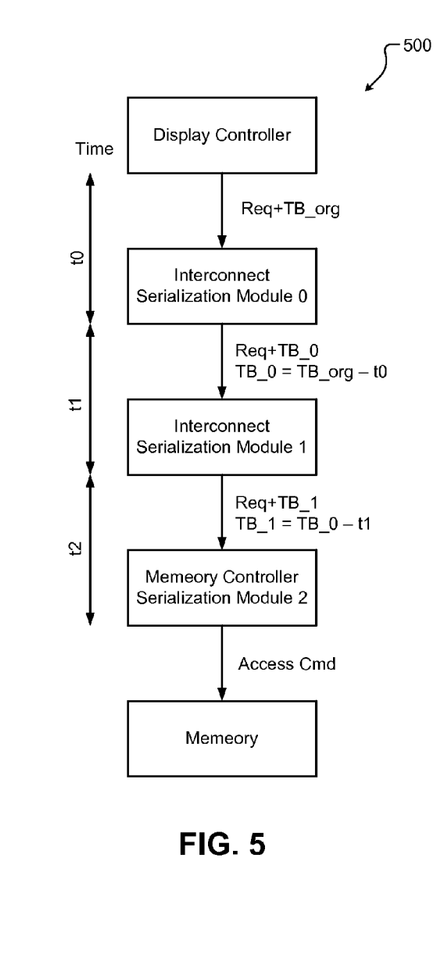
FIG. 5 shows an example of a flow of a command from a display controller to memory in an SOC using a timing budget to control QOS in the SOC according to the present disclosure.

FIG. 5 shows an example of a flow 500 of a command from the display controller 114 to the memory 102 using the timing-budget-based QOS scheme according to the present disclosure. Each serialization module downstream receives the request issued by the bus master (e.g., the display controller 114) and a corresponding timing budget (TB) from a serialization module located upstream. The timing budget issued by the bus master indicates a time in which the request should be serviced to maintain a predetermined performance level of the bus master. Each serialization module sends the request and a regenerated TB downstream. The regenerated TB by a serialization module is equal to an input TB received from an upstream serialization module minus the time consumed to arbitrate and output the request in the serialization module. The arbitrations in each serialization module depend on the input TB and the delay in the serialization module. For example, the arbitrations in serialization module 1 take both TB_0 (i.e., the timing budget received from serialization module 0) and t1 (i.e., the delay in serialization module 1) into account.

For example, in FIG. 5, the display controller 114 generates a request and an original timing budget TB_org. The serialization module 0 receives the request and TB_org and knows that the request should be serviced in TB_org. After a delay t0, serialization module 0 sends out the request and a regenerated TB_0=TB_org−t0. The downstream serialization module 1 receives the request with TB_0 and knows that the request should be serviced in TB_0, and so on.

The timing-budget-based QOS can coexist with other QOS schemes. The arbitration can be based on a weighted function that considers the QOS value and TB+delay. The QOS value can indicate the importance of the request, while the TB value can indicate the urgency of the request.

A global virtual clock is used to determine timing budget (TB) throughout the SOC. The TB in the SOC is measured in units of a number of cycles of the virtual clock. For example only, suppose that a frequency of the virtual clock is 500 MHz. Accordingly, if the TB value is 11, the timing budget for the request is 11 clock cycles of the virtual clock, which is 22 ns. For example only, an 8-bit TB field can be defined for each request as follows. Bit [7] may be unit select, and bits [6:0] may indicate a timing budget unit count. When Bit [7] is 0, each unit of the timing budget unit count corresponds to a fine unit (1-cycle of virtual clock). When Bit [7] is 1, each unit of the timing budget unit count corresponds to a coarse unit (16-cycles of virtual clock).

For example only, the TB values may be as follows: [1'b0, 7'h00]: critical; [1'b0, 7'h01]~[1'b0, 7'h3F]: fine unit, important; [1'b1, 7'h00]~[1'b1, 7'h1F]: coarse unit, medium priority; and [1'b1, 7'h20]~[1'b1, 7'h3E]: coarse unit, low priority. 8'hFF: don't care latency, lowest priority. Throughout the present disclosure, a notation of the form N'xV is used, where N denotes the number of bits, x denotes a numbering system used, and V denotes a value in units of the numbering system used. For example, x=b indicates binary numbering system; x=h indicates hexadecimal numbering system; and x=d indicates decimal numbering system.

Figure 6:
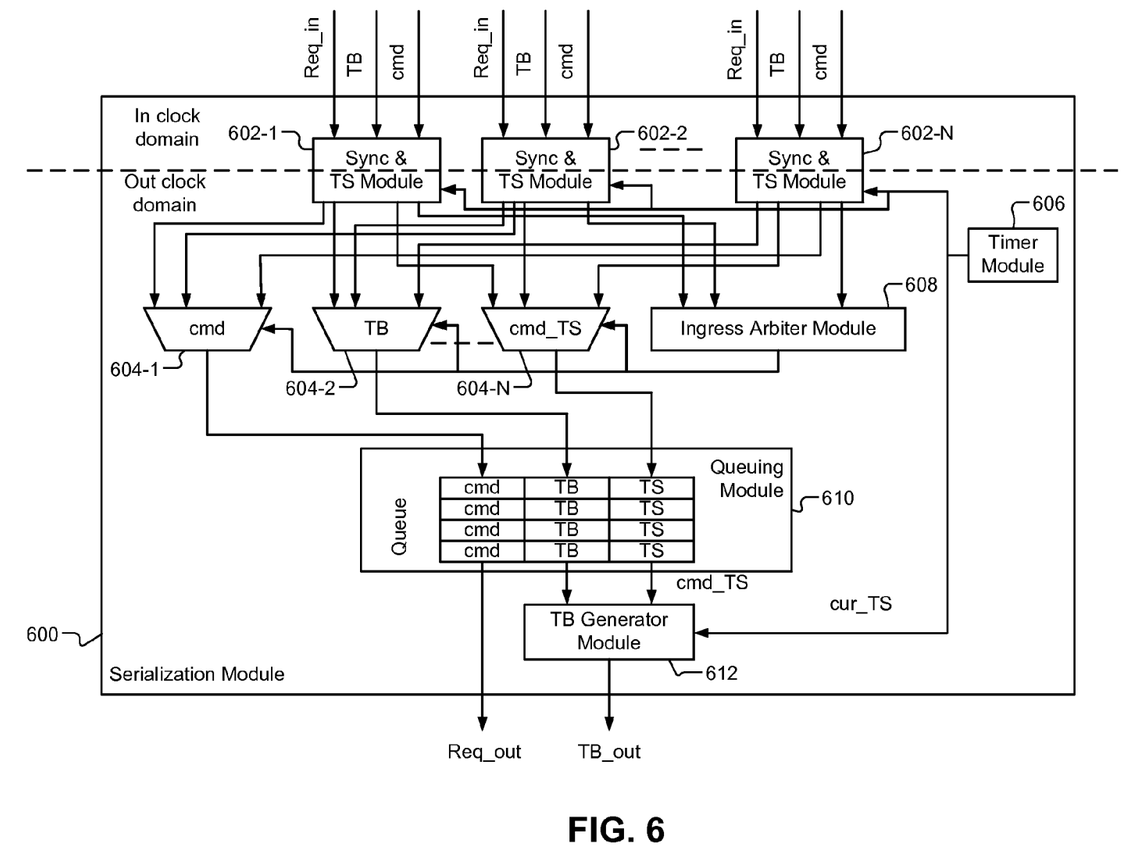
FIG. 6 is a functional block diagram of a serialization module including multiple channels that uses a timing budget according to the present disclosure.

FIG. 6 shows a serialization module 600 employing the timing-budget-based QOS scheme according to the present disclosure. For simplicity of illustration, the serialization module 600 is shown to include only one channel. The teachings described herein, however, can be easily extended to a serialization module including multiple channels.

The serialization module 600 includes a plurality of synchronization and time stamp (sync and TS) modules 602-1, 602-2, . . . , and 602-N, where N is an integer greater than 1 (collectively sync and TS modules 602); first, second, and third multiplexers 604-1, 604-2, and 604-3 (collectively multiplexers 604); a timer module 606, an ingress arbiter module 608, a queuing module 610, and a timing budget (TB) generator module 612.

Each of the sync and TS modules 602 receives a request (i.e., a QOS value requested by a bus master), a timing budget associated with the request, and a command associated with the request from a plurality of upstream devices. The upstream devices may include one or more bus masters and/or one or more upstream serialization modules.

The timer module 606 generates timing information based on a local clock of the serialization module 600. The timing information is used by the sync and TS modules 602 to generate time stamps when requests are received by the sync and TS modules 602. The timing information is also used by the serialization module 600 to generate time stamps when the serialization module 600 outputs requests with regenerated timing budgets.

Each of the sync and TS modules 602 receives the timing information from the timer module 606. Based on the timing information, each of the sync and TS modules 602 generates a time stamp when a request is received by the respective sync and TS module 602. Additionally, each of the sync and TS modules 602 synchronizes the received request, the command, and the timing budget to the local clock of the serialization module 600.

Each of the sync and TS modules 602 outputs the command associated with the request, the timing budget associated with the request, and the time stamp associated with the request to the respective multiplexers 604. The multiplexers 604 output a command received from one of the sync and TS modules

602, a timing budged associated with the command, and a time stamp associated with the command to the queuing module 610 based on control signals received from the ingress arbiter module 608.

The ingress arbiter module 608 receives the requests and the respective timing budgets and the commands associated with the requests from the sync and TS modules 602. The ingress arbiter module 608 determines wait times, which are differences between the time stamps associated with the commands and a current time stamp being used by the timing budget generator module 612. Based on the wait times, the ingress arbiter module 608 selects one of the requests and outputs the selected request and the respective timing budget and the command associated with the selected request from the multiplexers 604 to the queuing module 610.

The queuing module 610 queues the requests and the respective timing budgets and the commands associated with the requests received from the multiplexers 604 in a first-in first-out (FIFO) manner. The queuing module 610 outputs the request at the top of the queue to a downstream device. The downstream device can be a serialization module or the destination (e.g., a resource such as the memory 102).

The timing budget generator module 612 regenerates the timing budget for each command output by the serialization module 600. The timing budget generator module 612 regenerates the timing budget for a command based on the timing budget for the command received from the upstream device, the time stamp for the command when the command was received by the serialization module 600, and a current time stamp at the time when the command is output by the serialization module 600. The timing budget generator module 612 outputs the regenerated timing budget for the command when the command is output by the serialization module 600.

The timing budgets are regenerated as follows. For example only, two registers may be used to control time domain conversion. A first register may be called Local_TB_time_ratio_ctrl0, and a second register may be called Local_TB_time_ratio_ctrl1. For example only, the first register Local_TB_time_ratio_ctrl0 can be a 5-bit register. The second register Local_TB_time_ratio_ctrl1 can be a 3-bit register.

A time domain conversion (from global clock to local clock) is performed as follows. Delta_TS=cur_TS−cmd_TS (in local clock time domain). Serialization_module_latency= (Delta_TS*Local_TB_time_ratio_ctrl0)>>Local_TB_time_ratio_ctrl1, where >> denotes a right shift operation. The regenerated timing bdget is TB_out=cmd_TB−Serialization_module_latency (in global virtual clock time domain). Rounding may be performed as needed. For better conversion accuracy, more bits can be used for the two registers. A look-up table can be implemented for the time domain conversion to simplify the multiplication and division.

Following is an example of timing budget regeneration and time domain conversion. For example only, suppose that the global virtual clock is 500 MHz and that the local clock used by the timer module 606 of the serialization module 600 is 533 MHz. To calculate a conversion ratio used to convert timing between the global virtual clock and the local clock used by the timer module 606, the first and second registers can be programmed as follows.
Local_TB_time_ratio_ctrl0=5'd15, and Local_TB_time_ratio_ctrl1=3'd4.

Suppose further that the timing budget received for a command from an upstream device is Input TB=35 (clock cycles of global virtual clock) and that the time stamp Cmd_TS when the command is received is 10'd5. When the command reaches the top of the queue and is output from the serialization module 600, suppose that the timer value (i.e., the current time stamp) is cur_TS=10'd18. The delay in the serialization module 600 (i.e., latency of the serialization module 600) is calculated as follows. Serialization_module_lat=((18−5) *15)>>4=12 (in virtual clock domain after rounding). The timing budget for the command when the command is output from the serialization module 600 is calculated as follows. TB_out=Input TB−Serialization_module_lat=35−12=23. Accordingly, the downstream device will receive the request with a regenerated TB value of 23.

For example only, suppose that the serialization module 600 receives requests from one of the CPUs 104 and the display controller 114, where the requests from the CPU 104 are low-latency requests, and the requests from the display controller 114 are real-time requests. The serialization module 600 may arbitrate the requests as follows. If the timing budget of the request received from the display controller 114 is large relative to the timing budget of the request received from the CPU 104, the serialization module 600 may arbitrate in favor of the CPU 104, withhold the request received from the display controller 114, and output the request received from the CPU 104 to a downstream device (e.g., a resource such as the memory 102). If the timing budget of the request received from the display controller 114 is small relative to the timing budget of the request received from the CPU 104, the serialization module 600 may arbitrate in favor of the display controller 114, withhold the request received from the CPU 104, and output the request received from the display controller 114 to a downstream device (e.g., a resource such as the memory 102). The serialization module 600 may employ accurate real-time and dynamic control to improve the system performance.

Teachings similar to those described above with reference to FIG. 6 can be applied to in a multi-channel serialization module configuration such as the serialization module 200 shown in FIG. 2A. According to the teachings, the egress arbiter 204 takes the TB and TS information into account to arbitrate requests received from two or more upstream devices and to regenerate TB values.

Figure 7:
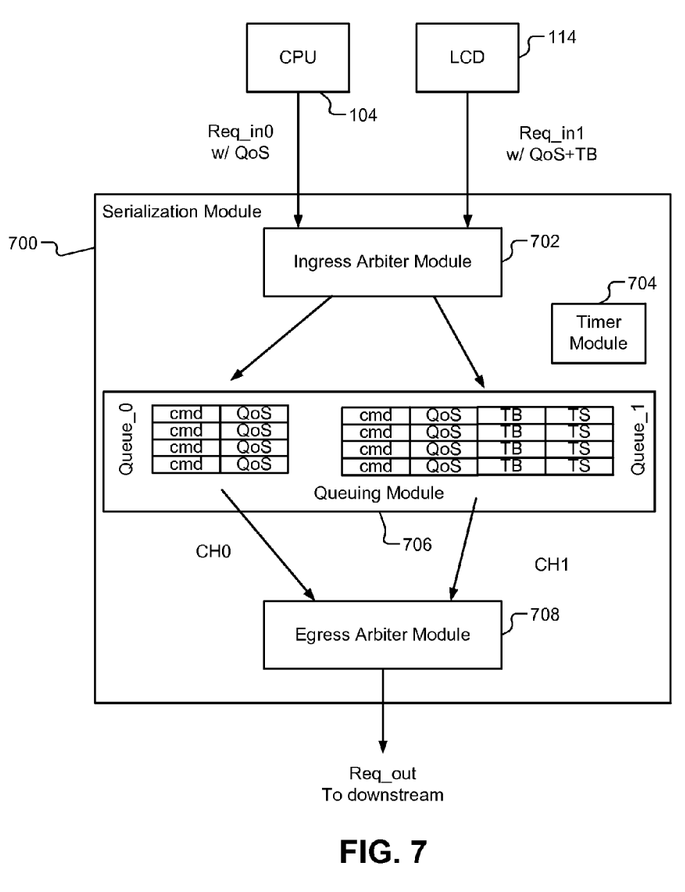
FIG. 7 is a functional block diagram of a serialization module including a combination of QOS control with and without using a timing budget according to the present disclosure.

FIG. 7 shows an example of a serialization module 700, where the teachings of the present disclosure can coexist with traditional serialization module processing. The timing-budget-based QOS can coexist with other QOS schemes. The serialization module 700 includes an ingress arbiter module 702, a timer module 704, a queuing module 706, and an egress arbiter module 708.

For example only, the serialization module 700 is shown to include only two channels CH0 and CH1. Additional channels may be used. For example only, the serialization module 700 is shown to receive requests from one of the CPUs 104 and the display controller 114 located upstream, where the requests from the CPU 104 are low-latency requests, and the requests from the display controller 114 are real-time requests.

Traditional QOS control may be implemented for both bus masters (the CPU 104 and the display controller 114), where the CPU 104 has high priority because the latency of the CPU 104 has a greater impact on the performance relative to the latency of the display controller 114. Accordingly, for example, a value of 4'hF can be assigned to the QOS of the CPU 104. The display controller 114 has relatively low priority because the display controller 114 can use a buffer to smooth out traffic. The display controller 114 has a higher access latency requirement than the CPU 104 so that the buffer does not underflow. Accordingly, for example, a value of 4'hE (a number smaller than the QOS of the CPU 104) can be assigned to the QOS of the display controller 114.

Traditional QOS based control is used for the channel CH0 for the CPU 104. The timing-budget-based control described with reference to FIG. 6 can be implemented for the channel CH1 for the display controller 114. Details of the timing-budget-based control described with reference to FIG. 6 are neither shown nor described again for simplicity of illustration and to avoid repetition. A register Serialization_module_TB_THR is defined for the serialization module 700. This register can be programmed to different TB threshold values based on the location of the serialization module 700 in the path.

The egress arbiter module 708 performs arbitration as follows. If the regenerated TB value Q_1 TB_out for the channel CH1 for the display controller 114 is less than or equal to the threshold TB value Serialization_module_TB_THR, the egress arbiter module 708 selects the command at the top of the queue Q_0 or the queue Q_1 according to the QOS values of the commands at the top of the queue Q_0 and the queue Q_1. That is, the command with a higher QOS value is selected and output. The egress arbiter module 708 outputs the selected command to a device downstream. If the regenerated TB value Q_1 TB_out for the channel CH1 for the display controller 114 is greater than the threshold TB value Serialization_module_TB_THR, the egress arbiter module 708 selects the command at the top of the queue Q_1. The egress arbiter module 708 outputs the selected command and the regenerated TB Q_1 TB_out for the selected command to the device downstream.

Figure 8:
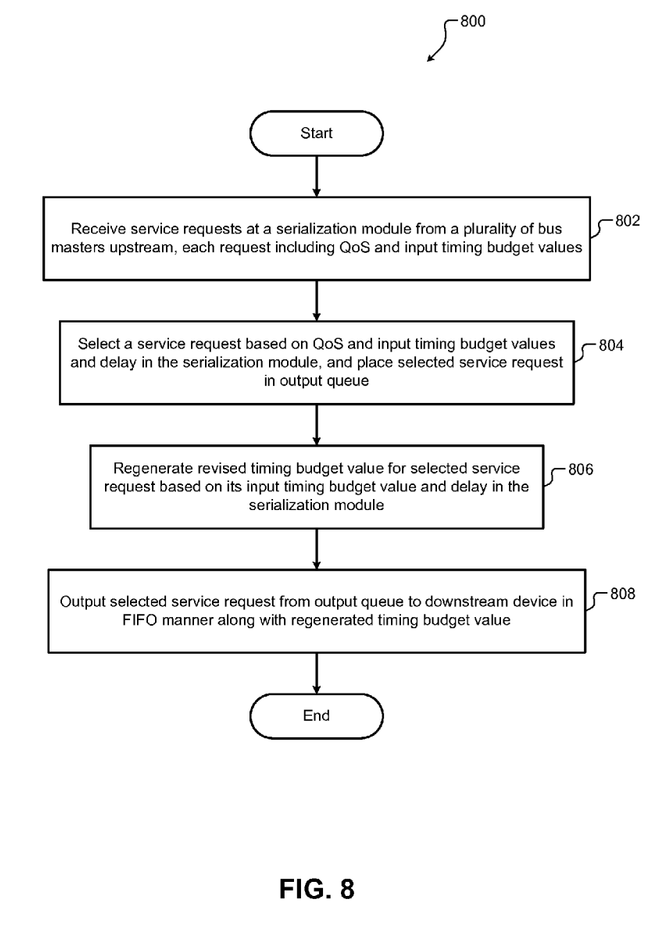
FIG. 8 is a flowchart of a method for a timing-budget-based QOS control in an SOC according to the present disclosure.

FIG. 8 shows a method 800 for a timing-budget-based QOS control in an SOC according to the present disclosure. At 802, control receives service requests at a serialization module in the SOC from a plurality of bus masters located upstream, where each service request includes a corresponding QOS value and an input timing budget value indicating a time within which the service request should be serviced. At 804, control selects one of the service requests based on the respective QOS values, the input timing budget values, and a time delay in the serialization module, and places the selected service request in an output queue of the serialization module. At 806, control regenerates a revised timing budget value for the selected service request based on the input timing budget value of the selected service request and the time delay in the serialization module. At 808, control outputs the selected service request from the output queue to a downstream device in a first-in first-out (FIFO) manner along with the regenerated timing budget value.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system-on-chip comprising:
    an ingress arbiter module configured to
        receive a plurality of service requests respectively from a plurality of devices of the system-on-chip to access a resource of the system-on-chip,
            wherein the plurality of devices is located upstream in the system-on-chip relative to the ingress arbiter module,
            wherein the resource is located downstream in the system-on-chip relative to the ingress arbiter module,
            wherein each of the plurality of service requests includes (i) a quality of service value associated with the respective service request, and (ii) a first timing budget value specified by the respective device for the respective service request, and
            wherein the first timing budget value indicates an amount of time in which the respective service request is to be serviced by the resource; and
        select a first service request from the plurality of service requests based on (i) the quality of service values, (ii) the first timing budget values, and (iii) a time delay associated with arbitrating the plurality of service requests and outputting the first service request downstream; and
    a timing budget generator module configured to generate a second timing budget value for the first service request based on (i) the first timing budget value associated with the first service request, and (ii) the time delay.

2. The system-on-chip of claim 1, further comprising a queuing module configured to:
    place the first service request in a queue, and
    output the first service request downstream from the queue in a first-in first-out manner with (i) the quality of service value associated with the first service request and (ii) the second timing budget value associated with the first service request.

3. The system-on-chip of claim 1, wherein the first and second timing budget values are based on a global clock of the system-on-chip, and wherein the ingress arbiter module and the timing budget generator module use a local clock, the system-on-chip further comprising:
a synchronization and timestamp module configured to
synchronize the plurality of service requests to the local clock, and
timestamp, based on the local clock, each of the plurality of service requests with a first time stamp in response to receiving each of the plurality of service requests.

4. The system-on-chip of claim 3, wherein:
the timing budget generator module is configured to timestamp, based on the local clock, the first service request with a second time stamp when outputting the first service request downstream, and
the time delay associated with arbitrating the plurality of service requests and outputting the first service request downstream is based on a difference between (i) the first time stamp associated with the first service request, and (ii) the second time stamp associated with the first service request.

5. The system-on-chip of claim 1, wherein:
the first service request is received from a first device of the plurality of devices; and
the arbiter module is configured to select, from the plurality of service requests, a second service request received from a second device of the plurality of devices, based on (i) the quality of service values, (ii) the first timing budget values, and (iii) a time delay associated with arbitrating the plurality of service requests and outputting the second service request downstream.

6. The system-on-chip of claim 5, wherein the timing budget generator module is configured to generate a third timing budget value for the second service request based on (i) the first timing budget value associated with the second service request, and (ii) the time delay associated with arbitrating the plurality of service requests and outputting the second service request downstream.

7. The system-on-chip of claim 6, further comprising a queuing module configured to:
place the first service request in a first queue associated with the first device,
place the second service request in a second queue associated with the second device,
output the first service request from the first queue in a first-in first-out manner with (i) the quality of service value associated with the first service request and (ii) the second timing budget value associated with the first service request, and
output the second service request from the second queue in a first-in first-out manner with (i) the quality of service value associated with the second service request and (ii) the third timing budget value associated with the second service request.

8. The system-on-chip of claim 7, further comprising an egress arbiter module configured to arbitrate the first service request output from the first queue and the second service request output from the second queue based on (i) the quality of service values associated with the first and second service requests, and (ii) the second and third timing budget values associated with the first and second service requests.

9. The system-on-chip of claim 6, wherein the first, second, and third timing budget values are based on a global clock of the system-on-chip, and wherein the ingress arbiter module and the timing budget generator module use a local clock, the system-on-chip further comprising:
a synchronization and timestamp module configured to
synchronize the plurality of service requests to the local clock, and
timestamp, based on the local clock, each of the plurality of service requests with a first time stamp in response to receiving each of the plurality of service requests.

10. The system-on-chip of claim 9, wherein:
the timing budget generator module is configured to timestamp, based on the local clock, (i) the first service request with a second time stamp when outputting the first service request downstream, and (ii) the second service request with a third time stamp when outputting the second service request downstream, and
the time delay associated with arbitrating the plurality of service requests and outputting the second service request downstream is based on a difference between (i) the first time stamp associated with the second service request, and (ii) the third time stamp associated with the first service request.

11. A method comprising:
receiving a plurality of service requests respectively from a plurality of devices of a system-on-chip to access a resource of the system-on-chip,
wherein the plurality of devices is located upstream in the system-on-chip,
wherein the resource is located downstream in the system-on-chip,
wherein each of the plurality of service requests includes (i) a quality of service value associated with the respective service request, and (ii) a first timing budget value specified by the respective device for the respective service request, and
wherein the first timing budget value indicates an amount of time in which the respective service request is to be serviced by the resource;
selecting a first service request from the plurality of service requests based on (i) the quality of service values, (ii) the first timing budget values, and (iii) a time delay associated with arbitrating the plurality of service requests and outputting the first service request downstream; and
generating a second timing budget value for the first service request based on (i) the first timing budget value associated with the first service request, and (ii) the time delay.

12. The method of claim 11, further comprising:
placing the first service request in a queue; and
outputting the first service request downstream from the queue in a first-in first-out manner with (i) the quality of service value associated with the first service request and (ii) the second timing budget value associated with the first service request.

13. The method of claim 11, wherein the first and second timing budget values are based on a global clock of the system-on-chip, and wherein the (i) receiving, (ii) selecting, (iii) outputting, and (iv) generating are performed using a local clock, the method further comprising:
synchronizing the plurality of service requests to the local clock; and
timestamping, based on the local clock, each of the plurality of service requests with a first time stamp in response to receiving each of the plurality of service requests.

14. The method of claim 13, further comprising:
timestamping, based on the local clock, the first service request with a second time stamp when outputting the first service request downstream,
wherein the time delay associated with arbitrating the plurality of service requests and outputting the first service request downstream is based on a difference between (i) the first time stamp associated with the first service request, and (ii) the second time stamp associated with the first service request.

15. The method of claim 11, further comprising:
receiving the first service request from a first device of the plurality of devices; and
selecting, from the plurality of service requests, a second service request received from a second device of the plurality of devices, based on (i) the quality of service values, (ii) the first timing budget values, and (iii) a time delay associated with arbitrating the plurality of service requests and outputting the second service request downstream.

16. The method of claim 15, further comprising generating a third timing budget value for the second service request based on (i) the first timing budget value associated with the second service request, and (ii) the time delay associated with arbitrating the plurality of service requests and outputting the second service request downstream.

17. The method of claim 16, further comprising:
placing the first service request in a first queue associated with the first device;
placing the second service request in a second queue associated with the second device;
outputting the first service request from the first queue in a first-in first-out manner with (i) the quality of service value associated with the first service request and (ii) the second timing budget value associated with the first service request; and
outputting the second service request from the second queue in a first-in first-out manner with (i) the quality of service value associated with the second service request and (ii) the third timing budget value associated with the second service request.

18. The method of claim 17, further comprising arbitrating the first service request output from the first queue and the second service request output from the second queue based on (i) the quality of service values associated with the first and second service requests, and (ii) the second and third timing budget values associated with the first and second service requests.

19. The method of claim 16, wherein the first, second, and third timing budget values are based on a global clock of the system-on-chip, and wherein the (i) receiving, (ii) selecting, (iii) outputting, and (iv) generating are performed using a local clock, the method further comprising:
synchronizing the plurality of service requests to the local clock; and
timestamping, based on the local clock, each of the plurality of service requests with a first time stamp in response to receiving each of the plurality of service requests.

20. The method of claim 19, further comprising:
timestamping, based on the local clock, (i) the first service request with a second time stamp when outputting the first service request downstream, and (ii) the second service request with a third time stamp when outputting the second service request downstream,
wherein the time delay associated with arbitrating the plurality of service requests and outputting the second service request downstream is based on a difference between (i) the first time stamp associated with the second service request, and (ii) the third time stamp associated with the first service request.

* * * * *